United States Patent [19]

Kleinschmidt et al.

[11] 4,028,476
[45] June 7, 1977

[54] TRANSPARENT POLYAMIDE ARMOR

[75] Inventors: Roger F. Kleinschmidt; Robert W. Campbell, both of Bartlesville, Okla.

[73] Assignee: Phillips Petroleum Company, Bartlesville, Okla.

[22] Filed: Oct. 22, 1975

[21] Appl. No.: 624,619

Related U.S. Application Data

[63] Continuation of Ser. No. 489,748, July 18, 1974, abandoned.

[52] U.S. Cl. .............................. 428/220; 89/36 R; 89/36 A; 89/36 D; 89/36 F; 109/49.5; 109/78; 428/474; 428/911
[51] Int. Cl.² .................... B32B 27/34; F41H 5/02; F41H 5/06; F41H 5/08
[58] Field of Search ................. 428/911, 220, 474; 89/36 R, 36 A, 36 D, 36 F; 260/78 R; 2/2.5; 109/78, 49.5

[56] References Cited

UNITED STATES PATENTS

| | | | |
|---|---|---|---|
| 2,399,184 | 4/1946 | Heckert | 428/474 |
| 2,512,606 | 6/1950 | Bolton | 260/78 R |
| 3,393,210 | 7/1968 | Speck | 260/78 R |
| 3,598,789 | 8/1971 | Tippetts | 260/78 R |
| 3,703,595 | 11/1972 | Falkenstein | 260/78 R |
| 3,838,111 | 9/1974 | Cambell | 260/78 R |
| 3,840,501 | 10/1974 | Shue | 260/78 R |
| 3,842,045 | 10/1974 | Campbell | 260/78 R |
| 3,866,242 | 2/1975 | Slagel | 89/36 A |
| 3,936,426 | 2/1976 | Campbell | 260/78 R |

*Primary Examiner*—Ellis Robinson

[57] ABSTRACT

A lightweight, transparent armor shield formed from a transparent, polymeric material formed by the polymerization of
A. at least one compound having the general formula

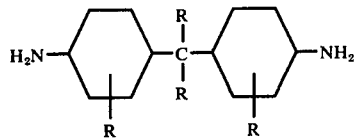

wherein each R is individually selected from the group consisting of —H and —CH₃; and
B. at least one polycarboxylic acid having from 6 to 26 carbon atoms.

17 Claims, No Drawings

TRANSPARENT POLYAMIDE ARMOR

This is a continuation of application Ser. No. 489,748, filed July 18, 1974, now abandoned.

This invention relates to transparent armor materials.

Selection of an armor material is simultaneously simple and difficult. On the one hand, almost any material qualifies as an armor material provided that the material is of sufficient thickness to preclude complete penetration of the material by a projectile or projectile fragment. On the other hand, as thickness of any material is increased, the bulk weight also increases. The problem becomes especially acute when selecting an armor material for a mobile application, whether it be a man or a truck. In recent years, a number of lightweight, opaque armor materials have been provided which can replace, entirely or in part, the steel armor-plate used heretofore. There still exists, however, a need for a lightweight, transparent armor material for use as vehicle windshields, building glazing materials and the like.

In selecting a transparent armor glazing material, primary consideration is generally given to the impact resistance, weight and optical properties of the materials under consideration. Glass, as an armor glazing material, has been largely supplanted by polymeric materials now available. Of the available polymeric materials, polycarbonate, a polymeric material having a relatively high impact resistance, as measured by the notched Izod test, is generally accepted as having superior ballistics properties, relatively low weight and good optical properties. It was surprising, therefore, to discover that the amorphous polyamides, produced by the polymerization of bis(4-aminocyclohexyl)methane (PACM) and methyl derivatives thereof with at least one polycarboxylic acid, are superior to polycarbonate in ballistics properties in view of the fact that they can have substantially lower notched Izod impact resistance values than the polycarbonates.

It is an object of this invention to provide an improved lightweight, transparent armor shield.

Other objects, aspects and advantages of the invention will become apparent to those skilled in the art upon consideration of the accompanying disclosure.

In accordance with the present invention there is provided a lightweight, transparent armor shield consisting essentially of a transparent, substantially amorphous, polymeric material formed by the polymerization of:

A. at lease one compound having the general formula

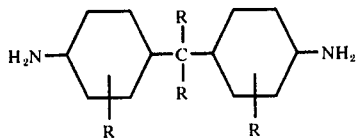

wherein each R is individually selected from the group consisting of hydrogen and —$CH_3$; and B. at least one polycarboxylic acid having from 6 to 26 carbon atoms per molecule selected from the group consisting of:
  a. straight chain dicarboxylic acids having from 6 to 18 carbon atoms,
  b. phenylindane dicarboxylic acids having the general formula

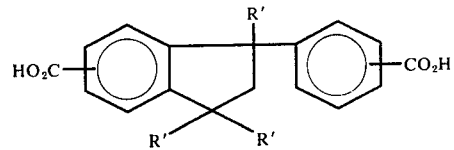

wherein each R' is selected from the group consisting of hydrogen and alkyl radicals having from 1 to 3 carbon atoms,
  c. tricarboxlyic acids having the general formula R''$(CO_2H)_3$, wherein R'' is a trivalent saturated or aromatic hydrocarbon radical having from 3 to 12 carbon atoms,
  d. bis(carboxylphenyl)methanes having the general formula

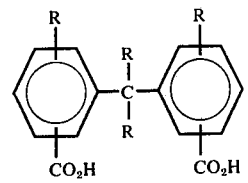

wherein R is —H or —$CH_3$, and
  e. mixtures thereof.

The generic amino entity illustrated above, i.e., compound (A), includes bis(4-aminocyclohexyl)methane, hereinafter referred to as "PACM", and carbocyclic ring-methyl derivatives thereof; and 2,2-bis(4-aminocyclohexyl)propane, hereinafter referred to as "PACP", and carbocyclic ring-methyl derivatives thereof. Mixtures of these diamines, as well as any of the geometric isomers (trans,trans, cis,trans, or cis,cis) or mixtures thereof, can be employed, except where specified otherwise below. Presently preferred diamines are unsubstituted PACM and unsubstituted PACP.

In accordance with one embodiment of this invention, amorphous polyamides suitable for use in this invention are produced by the polymerization of at least one of PACP or carbocyclic ring-methyl derivative thereof with at least one straight chain dicarboxylic acid having 6 to 18 carbon atoms.

In accordance with another embodiment, amorphous polyamides suitable for use in this invention are produced by polymerization of at least one of PACM or carbocyclic ring-methyl derivative thereof with a mixture of at least one phenylindanedicarboxylic acid or alkyl derivative thereof and at least one straight chain dicarboxylic acid having 6 to 18 carbon atoms. The straight chain dicarboxylic acid can be used in an amount of about 15 to about 85 mole percent of the total carboxylic acids employed.

In accordance with a further embodiment, amorphous poly(amideimide)s suitable for use in this invention are produced by the polymerization of at least one of PACM or carbocyclic ring-methyl derivative thereof with a mixture of at least one straight chain dicarboxylic acid having 6 to 18 carbon atoms and at least one tricarboxylic acid having the formula R''$(CO_2H)_3$, wherein R'' is a trivalent saturated or aromatic hydrocarbon radical having 3 to 12 carbon atoms. The tricarboxylic acid can be used in an amount of about 5 to about 60 mole percent of the total carboxylic acids employed.

In accordance with still another embodiment, amorphous polyamides suitable for use in this invention are produced by the polymerization of PACM having a trans,trans isomer content of less than 40 percent of its total geometric isomers with at least one straight chain dicarboxylic acid having 6 to 18 carbon atoms, the average number of carbon atoms in the dicarboxylic acid(s) being at least 7.

In accordance with an additional embodiment, amorphous polyamides suitable for use in this invention are produced by the polymerization of PACM or carbocyclic ring-methyl derivative thereof with a mixture of at least one bis(carboxyphenyl)methane or methyl derivative thereof and at least one straight chain dicarboxylic acid having from 6 to 18 carbon atoms. The straight chain dicarboxylic acid can be used in an amount of about 15 to about 85 mole percent of the total carboxylic acids employed.

In accordance with yet another embodiment, amorphous polyamides suitable for use in this invention are produced by the polymerization of PACM having a trans,trans isomer content of at least 40 percent with a mixture of about 50 to about 70 mole percent dodecanedioic acid and about 30 to about 50 mole percent suberic acid and/or azelaic acid.

The phenylindanedicarboxylic acid and alkyl derivatives thereof which can be employed in the preparation of amorphous polyamides suitable for use in this invention can be represented by the formula

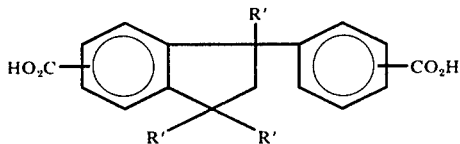

wherein each R' is selected from hydrogen and alkyl radicals having 1 to 3 carbon atoms. Mixtures of compounds represented by this formula can be employed. Presently preferred is 1,1,3-trimethyl-5-carboxy-3-(p-carboxyphenyl)indane.

The bis(carboxyphenyl)methane and methyl derivatives thereof which can be employed in the preparation of amorphous polyamides suitable for use in this invention can be represented by the formula

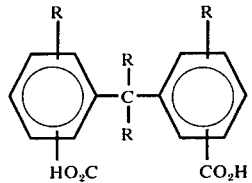

wherein each R is selected from hydrogen and methyl radicals. Mixtures of compounds represented by this formula can be used. Presently preferred is 2,2-bis(p-carboxyphenyl)propane.

The straight chain dicarboxylic acids having 6 to 18 carbon atoms which are applicable in the preparation of amorphous polyamides suitable for use in this invention can be represented by the formula $HO_2C(CH_2)_x CO_2H$, wherein $x$ is an integer of 4 to 16, preferably 5 to 10, these preferred values of 5 to 10 representing average values of $x$ when mixtures of straight chain dicarboxylic acids are employed. Thus, suitable straight cahin dicarboxylic acids include adipic acid, pimelic acid, suberic acid, azelaic acid, sebacic acid, un- decanedioic acid, dodecanedioic acid, tridecanedioic acid, tetradecanedioic acid, pentadecanedioic acid, hexadecanedioic acid, heptadecanedioic acid, octadecanedioic acid, and mixtures thereof.

Examples of tricarboxylic acids, defined above, which can be employed in the preparation of amorphous polyamides suitable for use in this invention include 1,2,3-propanetricarboxylic acid, 1,2,4-butanetricarboxylic acid, 4-methyl-1,2,6-hexanetricarboxylic acid, 1,2,12-dodecanetricarboxylic acid, 1,2,4-cyclohexanetricarboxylic acid, 1,2,4-benzenetricarboxylic acid, 6-ethyl-1,2,5-naphthalenetricarboxylic acid, and the like, and mixtures thereof.

In accordance with one presently preferred embodiment, an amorphous polyamide suitable for use in this invention is produced by the polymerization of PACP and azelaic acid.

In accordance with another presently preferred embodiment, an amorphous polyamide suitable for use in this invention is produced by the polymerization of PACP and a 60/40 molar ratio mixture of azelaic acid and adipic acid, respectively.

The polyamides and poly(amide-imides) for use in this invention are prepared by procedures well known in the art. In general, the reactants are heated at a temperature in the approximate range of from 400° to 640° F for about 2 to about 8 hours, or until the product has a sufficiently high molecular weight to exhibit impact resistant properties which properties are reached when the polyamide or poly(amide-imide) has an inherent viscosity of at least about 0.6, preferably from about 0.7 to about 2 (determined at 30° C in a m-cresol solution at a polymer concentration of 0.5 g/100 ml of solution). The reaction can be conducted at superatmospheric, atmospheric or subatmospheric pressure. Often it is desirable, especially in the last stages of the reaction, to employ conditions, e.g., reduced pressure, which will aid in the removal of reaction by-products. Preferably, the reaction is carried out in the absence of oxygen, e.g., in an atmosphere of nitrogen.

In the polymerization process, the molar ratio of component (A) to component (B) should be substantially 1:1. However, a slight excess, e.g., up to about 5 mole percent, of either component (A) or component (B) can be employed. The polymerization process can be carried out in the presence of conventional additives such as light stabilizers, optical brighteners and the like.

The amorphous polyamides can be converted to the desired shape by conventional methods, e.g., by extrusion, casting or by compression or injection molding. The thickness of the armor shield can vary, depending in part on the degree of protection required, but will generally be within the range of about 1/32 inch to about 2 inches, more often being within the range of about 1/16 inch to about 1 inch. Examples of some applications in which the armor shields are particularly useful include theater ticket vendor booths, bank teller cages, drive-in bank windows, armored vehicles, and the like.

The following examples illustrate the invention.

EXAMPLE I

In the preparation of an amorphous polyamide from 2,2-bis(4-aminocyclohexyl)propane, azelaic acid, and adipic acid, 2381 g (9.987 moles) 2,2-bis(4-aminocyclohexyl)propane (about 76 percent trans,trans), 1127.8 g (5.992 moles) azelaic acid, 583,66 g (3.995 moles) adipic acid, 0.4092 g manganese hypophosphite (a light stabilizer), 1023 ml water, and 0.2046 g 4,4'-bis(benzoxazol-2-yl)stilbene (an optical brightener) were charged to a reactor. After displacement of air from the reactor with nitrogen, the reactor was sealed under 60 psig nitrogen, and the reactor contents were heated to 410° F and maintained at that temperature under autogenous pressure for about 1¼ hours. The mixture was then heated to 590° F over a period of 40 minutes, during which time the pressure rose to about 400 psig. The mixture than was held at 590° F for 1 hour, the pressure being maintained at about 400 psig by venting as required. While still maintaining the temperature at 590° F, the reactor was vented to 0 psig over a period of 30 minutes, and nitrogen was then passed over the mixture at about 0 psig for 30 minutes. With the reactor still maintained at 590° F, the pressure in the system was then reduced over a period of approximately 30 minutes until the system was under a vacuum of about 27 inches Hg, at which pressure the mixture was maintained for 1 hour. After removal from the reactor, the resulting amorphous polyamide was found to have an inherent viscosity of 1.32, determined at 30° C in a m-cresol solution having a polyamide concentration of 0.5 g/100 ml solution, and a glass transition temperature of 182° C, determined by differential thermal analysis of a premelted and quenched sample. This product was ground and blended with the products from nineteen other runs conducted in similar manner to give a composite consisting of amorphous polyamide product from 2,2-bis(4-aminocyclohexyl)propane, azelaic acid, and adipic acid, the composite having an inherent viscosity of 1.22 and a glass transition temperature of 181° C, each determined as described above. Properties of samples of the composite compression molded at 560° F and of samples of the composite injection molded at 600° F are shown in Table I.

Table I

| | Compression Molded | Injection Molded |
|---|---|---|
| Density, g/cc[a] | 1.06 | 1.06 |
| Flexural Modulus, psi × 10⁻³[b] | 286 | 317 |
| Tensile Strength, psi[c] | 12540 | 11750 |
| Elongation, %[c] | 28 | 54 |
| Izod Impact Strength, ft-lb/in notch[d] | 0.88[e] | 0.96[f] |
| Heat Deflection Temperature, ° F at 264 psi[g] | 327 | 320 |
| Hardness, Shore D[h] | 85 | 85 |
| Taber Abrasion, 1 kg wt, mg/100 rev[i] | — | 8.5 |

[a]ASTM D 1505–68.
[b]ASTM D 790–66.
[c]ASTM D 638–68.
[d]ASTM D 256–56.
[e]Determined on speciments ⅛ inch thick.
[f]Determined on specimens ¼ inch thick.
[g]ASTM D 648–56.
[h]ASTM D 2240–68.
[i]ASTM D 1044–56, GS-17 wheel.

For use in a standard military ballistics test, MIL-STD-662A, a sample of the polyamide composite was compression molded at 525° F into a transparent slab 10 inches × ¼ inch. The result expressed below is in terms of $V_{50}$ limit which is the calculated velocity of the test projectile at which the probability exists that 50 percent of the projectiles fired will completely penetrate the molded sample and that 50 percent of the projectiles will be stopped by the sample. The projectile used in the tests was .22 calibre 17-grain fragment-simulating projectile. In this ballistics test the molded sample, which had an areal density of 22 ounces per square foot, had a $V_{50}$ rating of 925 fps.

EXAMPLE II

In the preparation of an amorphous polyamide from 2,2-bis(4-aminocyclohexyl)propane and azelaic acid 2673.1 g (11.215 moles) 2,2-bis(4-aminocyclohexyl)-propane (about 77 percent trans,trans), 2110.7 g (11.215 moles) azelaic acid, 1.04 g 4,4'-bis(benzoxazol-2-yl)stilbene, 0.53 g manganese hypophosphite, and 1200 ml water were charged to a reactor. After displacement of air from the reactor with nitrogen at atmospheric pressure, the reactor contents were heated to 410° F and maintained at that temperature under autogenous pressure for about 45 minutes. At this point it was observed that water had been lost through a leaking rupture disc, so the rupture disc and lost water were replaced. The temperature was then increased to 608° F over a period of about 1 hour, with venting as needed to prevent the pressure from exceeding 400 psig, after which the temperature was maintained at 608° F for 1 hour, with the pressure kept at 400 psig. While still maintaining the temperature at 608° F, the reactor was vented to 0 psig over a period of 15 minutes, and nitrogen was then passed over the mixture at about 0 psig for 30 minutes. With the reactor still maintained at 608° F, the pressure in the system was then reduced over a period of approximately 30 minutes until the system was under a vacuum of about 30 inches Hg, at which pressure the mixture was maintained for 1 hour. After removal from the reactor, the resulting amorphous polyamide was found to have an inherent viscosity of 1.10 and a glass transition temperature of 173° C, each determined as described in Example I. Properties of samples of the polyamide injection molded at 575° F are shown in Table II, these properties having been determined by methods shown in Example I.

Table II

| | |
|---|---|
| Density, g/cc | 1.05 |
| Flexural Modulus, psi × 10⁻³ | 297 |
| Tensile Strength, psi | 10200 |
| Elongation, % | 99 |
| Izod Impact Strength, ft-lb/in notch[a] | 0.92 |
| Heat Deflection Temperature, ° F at 264 psi | 298 |
| Hardness, Shore D | 83 |

[a]Determined on specimens ¼ inch thick.

A sample of the polyamide was compression molded at 525° F into a transparent slab 10 inches × 10 inches × ¼ inch for use in the ballistics test employed in Example I. The slab, which had an areal density of 22 ounces per square foot, had a $V_{50}$ rating of 878 fps.

Reasonable variations and modifications of this invention will be apparent to those skilled in the art in view of this disclosure. Such variations and modifications are within the scope and spirit of the disclosure.

What is claimed is:

1. A lightweight, transparent armor shield having a thickness of about 1/32 inch to about 2 inches, consisting essentially of a transparent, substantially amonphouse polymeric material having an inherent viscosity of at least about 0.6 formed by the polymerization of:

A. at least one compound having the general formula

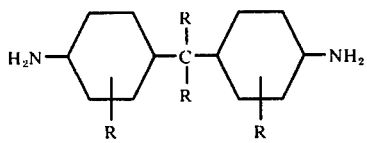

wherein each R is individually selected from the group consisting of hydrogen and —CH₃; and
  b. at least one polycarboxylic acid having from 6 to 26 carbon atoms per molecule selected from the group consisting of:
    a. straight chain dicarboxylic acids having from 6 to 18 carbon atoms,
    b. phenylidane dicarboxylic acids having the general formula

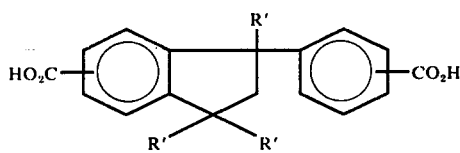

wherein each R' is selected from the group consisting of hydrogen and alkyl radicals having from 1 to 3 carbon atoms;
    c. tricarboxylic acids having the general formula R''(CO₂H)₃, wherein R'' is a trivalent saturated or aromatic hydrocarbon radical having from 3 to 12 carbon atoms,
    d. bis(carboxyphenyl)methanes having the general formula

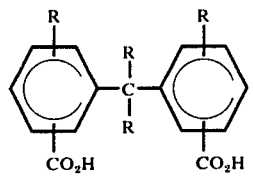

wherein R is —H or —CH₃, and
    e. mixtures thereof wherein an armor shield having a thickness of about ¼ inch is capable of having a $V50$ rating of at least about 878 fps, as determined according to MID-STD-662A, when fired at by a .22 califre 17-grain fragment-simulating projectile.

2. The shield of claim 1 wherein said compound (A) is 2,2-bis(4-aminocyclohexyl)propane.

3. The shield of claim 2 wherein said acid (B) is at least one straight chain dicarboxylic acid having from 6 to 18 carbon atoms.

4. The shield of claim 3 wherein said acid (B) is a mixture of azelaic acid and adipic acid in a mole ratio of azelaic to adipic of about 60:40.

5. The shield of claim 3 wherein said acid (B) is azelaic acid.

6. The shield of claim 1 wherein said compound (A) is bis(4-aminocyclohexyl)methane.

7. The shield of claim 6 wherein said acid (B) is a mixture of at least one straight chain dicarboxylic acid having from 6 to 18 carbon atoms and at least one bis(carboxyphenyl)methane having the general formula

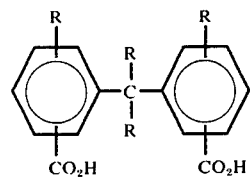

wherein each R is individually selected from the group consisting of hydrogen and —CH₃.

8. The shield of claim 7 wherein said straight chain dicarboxylic acid is present in said acid mixture in an approximate amount ranging from 15 to 85 mole percent of the total carboxylic acids.

9. The shield of claim 6 wherein said acid (B) is a mixture of straight chain dicarboxylic acids, wherein the average number of carbon atoms per molecule of said acid is at least 7, and wherein said compound (A) has a trans,trans isomer content of less than 40 percent of its total geometric isomers.

10. The shield of claim 6 wherein said compound (A) has a trans,trans isomer content of at least 40 percent of its total geometric isomers and said acid (B) is a mixture of acids comprising about 50 to 70 mole percent dodecanedioic acid and about 30 to 50 mole percent suberic and/or azelaic acid.

11. The shield of claim 6 wherein said acid (B) is a mixture of at least one phenylindanedicarboxylic acid having the general formula

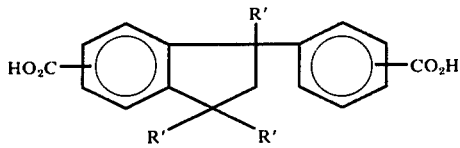

wherein each R' is individually selected from the group consisting of hydrogen and alkyl having from 1 to 3 carbon atoms, and at least one straight chain dicarboxylic acid having from 6 to 18 carbon atoms.

12. The shield of claim 11 wherein said straight chain dicarboxylic acid is present in said acid mixture in an approximate amount ranging from 15 to 85 mole percent of the total carboxylic acids.

13. The shield of claim 6 wherein said acid (B) is a mixture of at least one straight chain dicarboxylic acid having from 6 to 18 carbon atoms and at least one tricarboxylic acid having from 6 to 15 carbon atoms.

14. The shield of claim 13 wherein said tricarboxylic acid is present in said acid mixture in an approximate amount ranging from 5 to 60 mole percent of the total carboxylic acids.

15. The shield of claim 1 wherein said thickness ranges from about 1/16 inch to about 1 inch.

16. The shield of claim 4 having a thickness of about ¼ inch and an areal density of about 22 ounces per square foot.

17. The shield of claim 5 having a thickness of about ¼ inch and an areal density of about 122 ounces per square foot.

* * * * *